United States Patent [19]
Bro et al.

[11] Patent Number: 5,360,222
[45] Date of Patent: Nov. 1, 1994

[54] TOY WAGON

[75] Inventors: Jay M. Bro; Philip M. Baerenwald, both of Plano, Tex.

[73] Assignee: Today'Kids, Inc., Boonesville, Ark.

[21] Appl. No.: 14,392

[22] Filed: Feb. 5, 1993

[51] Int. Cl.$^5$ .................. B62B 3/02; B62M 1/00
[52] U.S. Cl. .................. 280/87.021; 280/47.34; 280/47.371
[58] Field of Search ........... 280/87.01, 87.021, 87.043, 280/47.34, 47.371, 47.38, 655.1, 47.315

[56] References Cited

U.S. PATENT DOCUMENTS

| | | | |
|---|---|---|---|
| 541,887 | 7/1895 | Shull | 280/87.01 |
| 1,203,831 | 11/1916 | Wittman | 280/87.01 |
| 1,771,813 | 7/1930 | Norman | 280/87.01 |
| 1,946,422 | 2/1934 | Carter | 280/87.01 |
| 4,052,082 | 10/1977 | Jones et al. | 280/87.021 |
| 4,346,908 | 8/1982 | Kassai | 280/87.021 |
| 4,354,689 | 10/1982 | Perego | 280/47.371 |
| 4,722,115 | 2/1988 | Yang | 16/45 |
| 4,950,003 | 8/1990 | Holtz | 280/47.315 X |
| 4,958,843 | 9/1990 | Cole | 280/87.043 X |
| 4,963,115 | 10/1990 | Davin et al. | 446/96 |

FOREIGN PATENT DOCUMENTS

| 2068749 | 8/1981 | United Kingdom | 280/87.021 |
|---|---|---|---|

*Primary Examiner*—Margaret A. Focarino
*Assistant Examiner*—Peter English
*Attorney, Agent, or Firm*—Kirkpatrick & Lockhart

[57] ABSTRACT

A ridable toy wagon is disclosed. The wagon has a body member that has a first hauling capacity and rotatable wheels attached thereto for movably supporting the body member on a surface. A seat member is pivotally attached to the body member and is pivotal between a first occupant supporting position wherein an opening in the bottom of the body member is exposed and a second position wherein the opening is covered and the body member's hauling capacity is increased. An extendable handle is pivotally attached to the body member to enable the wagon to be pulled thereby.

7 Claims, 13 Drawing Sheets

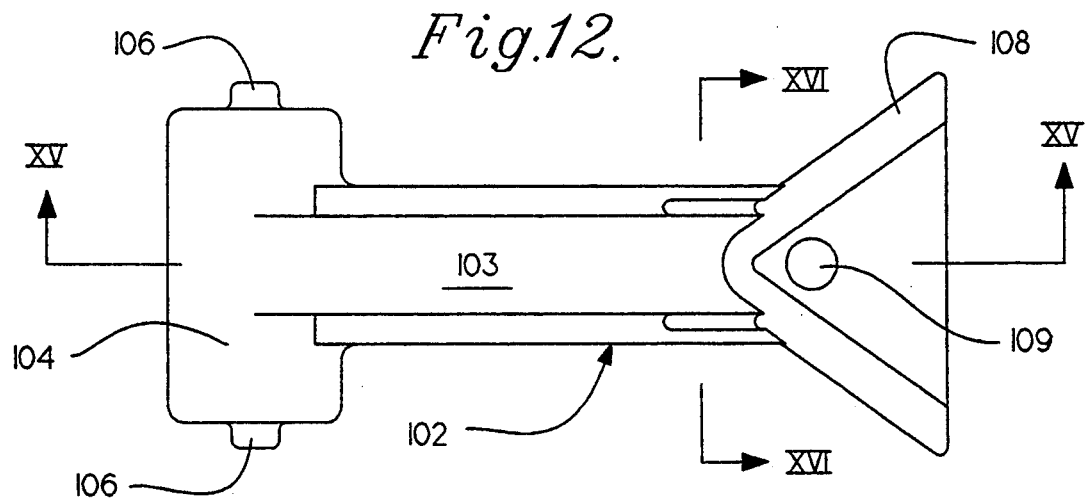
*Fig.12.*
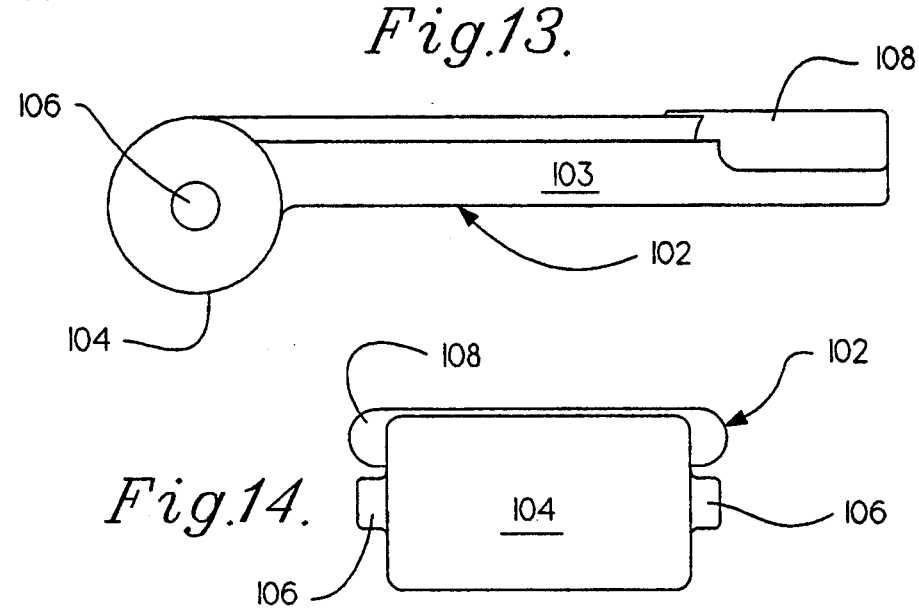
*Fig.13.*
*Fig.14.*
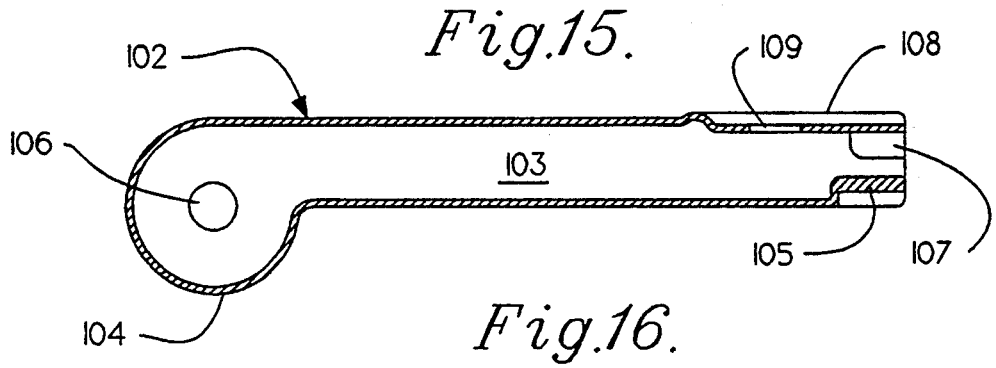
*Fig.15.*
*Fig.16.*

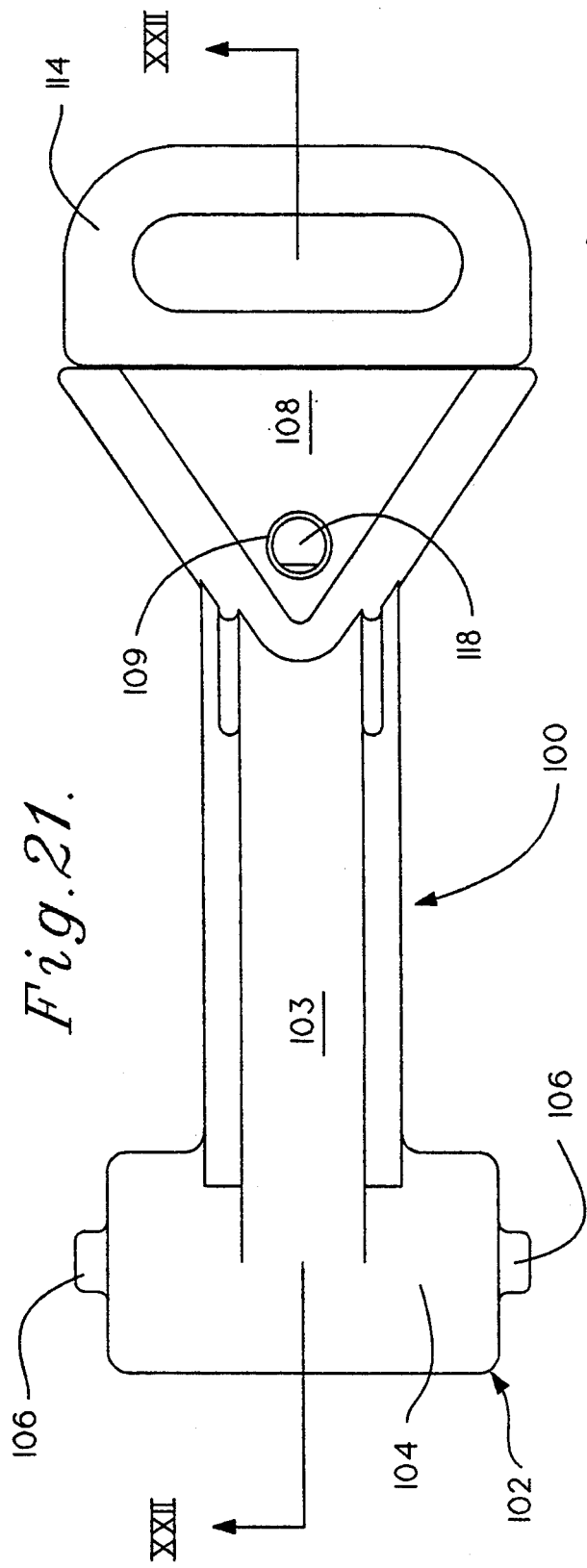
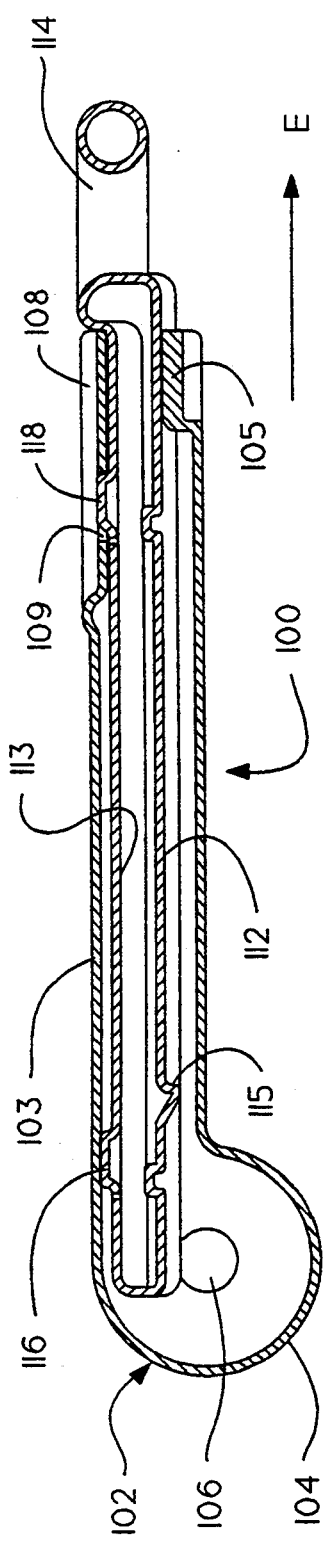

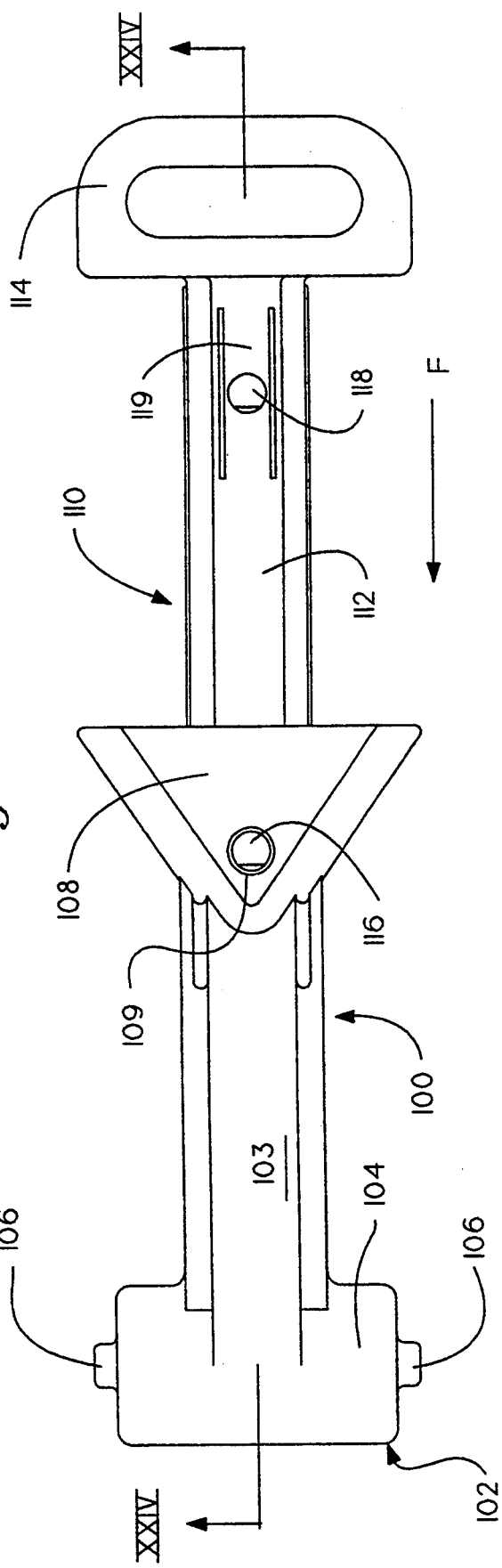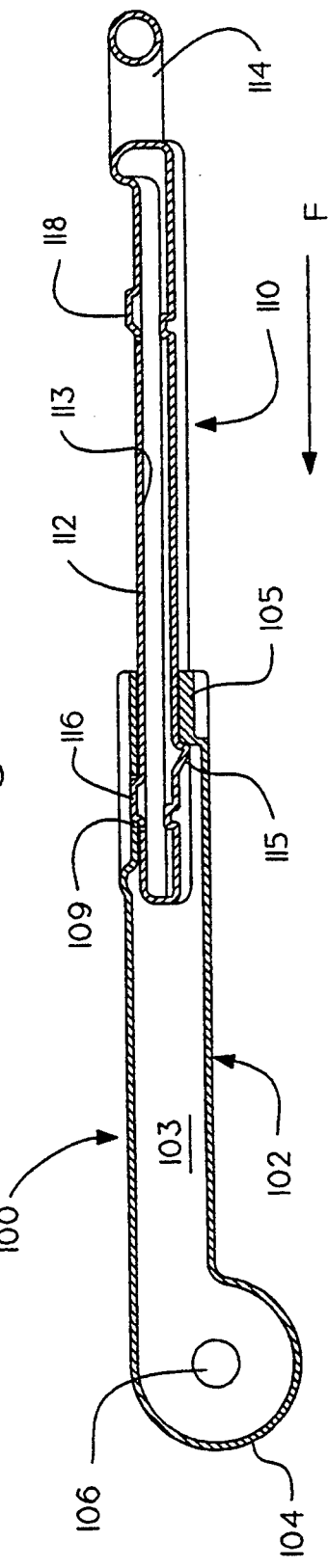

TOY WAGON

BACKGROUND OF THE INVENTION

1. Field of the Invention

The present invention relates to toy riding devices and, more particularly, is directed to ridable toy wagons.

2. Description of the Invention Background

Wheeled wagons and carts, in some form or another, have existed since man's invention of the wheel. To man's delight, such apparatuses made the transportation of a variety of different articles much easier and safer. No doubt, from the very beginning, man fashioned such apparatuses in a variety of sizes and shapes, some of which were probably the predecessors of today's toy wagons.

Perhaps some people's fondest memories of their childhood days involve hauling their favorite toys or playmates around in their trusty toy wagon. Today's toy wagons are usually made from metal and/or plastic and generally comprise an elongated box-shaped body member with four wheels and a handle attached thereto.

Some previous and current wagons are sized such that a small child can sit or ride in the box-shaped body member. Unfortunately, because the body members of those toy wagons typically have a bottom member that extends the entire length thereof, the rider's feet are prevented from touching the ground. As such, the rider cannot, alone, propel the wagon and, thus, must rely on another person to pull the wagon with the handle. In addition, depending upon the length of the handle member and the height of the person pulling the wagon, that person is often forced to assume an awkward or bent over position in order to grasp the wagon's handle. Also, prior and current toy wagons are typically incapable of having their hauling capacity selectively increased or decreased.

It is an object of the present invention to provide a wagon that can be ridden by a child or, in the alternative, function as a device for hauling and transporting articles such as small toys and the like.

It is another object of the present invention to provide a toy wagon that can be propelled either by a child riding in the wagon or by a person walking in front of the wagon.

It is another object of the present invention to provide a handle member for a toy wagon that is selectively extendable to predetermined lengths.

It is yet another object of the present invention to provide a toy wagon having a hauling capacity that may be selectively increased or decreased.

SUMMARY OF THE INVENTION

In accordance with the particular preferred form of the present invention, there is provided a toy wagon having a body member that defines a storage area. A seat member is preferably pivotally attached to the body member such that it may pivot between a first occupant supporting position overlying the storage area and a second position wherein the storage area is uncovered. A plurality of rotatable wheels are attached to the body for movably supporting the body on a surface. A handle member of adjustable length is also preferably attached to the body member.

Accordingly, the present invention provides a toy wagon that can function as a toy riding device or, in the alternative, function as a device for transporting and hauling a variety of different articles. In addition, the toy wagon of the present invention can be propelled by a rider that is seated in the wagon or, in the alternative, by an individual walking in front of the wagon and pulling the wagon with the handle member thereof. Also, the present wagon's hauling capacity may be selectively increased by adding side panels to the body member or by pivoting the seat forward.

As such, the unique attributes of the toy wagon of the present invention accomplishes the aforementioned objectives. The reader will appreciate that these attributes and other details, objects and advantages will become apparent as the following detailed description of the present preferred embodiment thereof proceeds.

BRIEF DESCRIPTION OF THE DRAWINGS

In the accompanying drawings, we have shown a present preferred embodiment of the invention wherein like reference numerals are employed to designate like parts and wherein:

FIG. 12 is a top view of the lower handle member of the present invention;

FIG. 13 is side elevational view of the lower handle member of the present invention;

FIG. 14 is a front elevational view of the lower handle member of the present invention;

FIG. 15 is a cross-sectional elevational view of the lower handle member of the present invention taken along line XV—XV in FIG. 12;

FIG. 16 is a cross-sectional elevational view of the lower handle member of the present invention taken along line XVI—XVI in FIG. 12;

FIG. 21 is a top view of the handle assembly of the present invention showing the upper handle member retracted into the lower handle member;

FIG. 22 is a cross-sectional assembly view of the handle assembly of FIG. 21 taken along line XXII—XXII of FIG. 21;

FIG. 23 is a top view of the handle assembly of the present invention showing the upper handle member extended from the lower handle member;

FIG. 24 is a cross-sectional assembly view of the handle assembly of FIG. 21 taken along line XXIV—XXIV of FIG. 23;

DETAILED DESCRIPTION OF THE PREFERRED EMBODIMENTS

Figure 1:
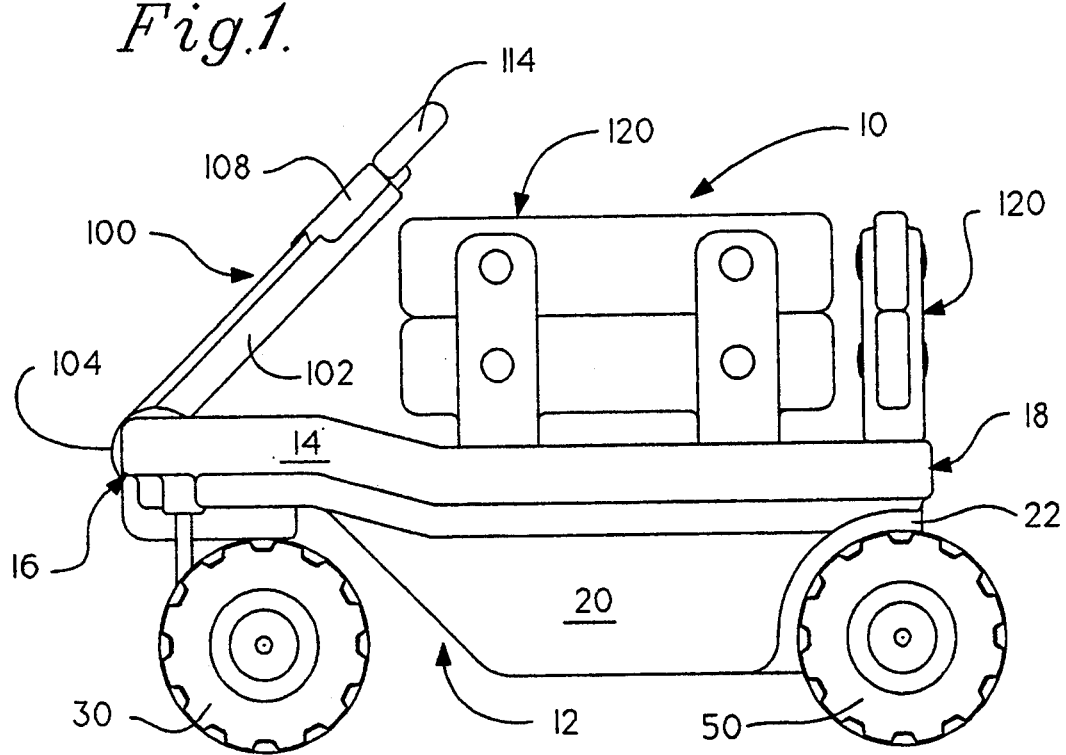
FIG. 1 is a side elevational view of the toy wagon of the present invention.
Figure 2:
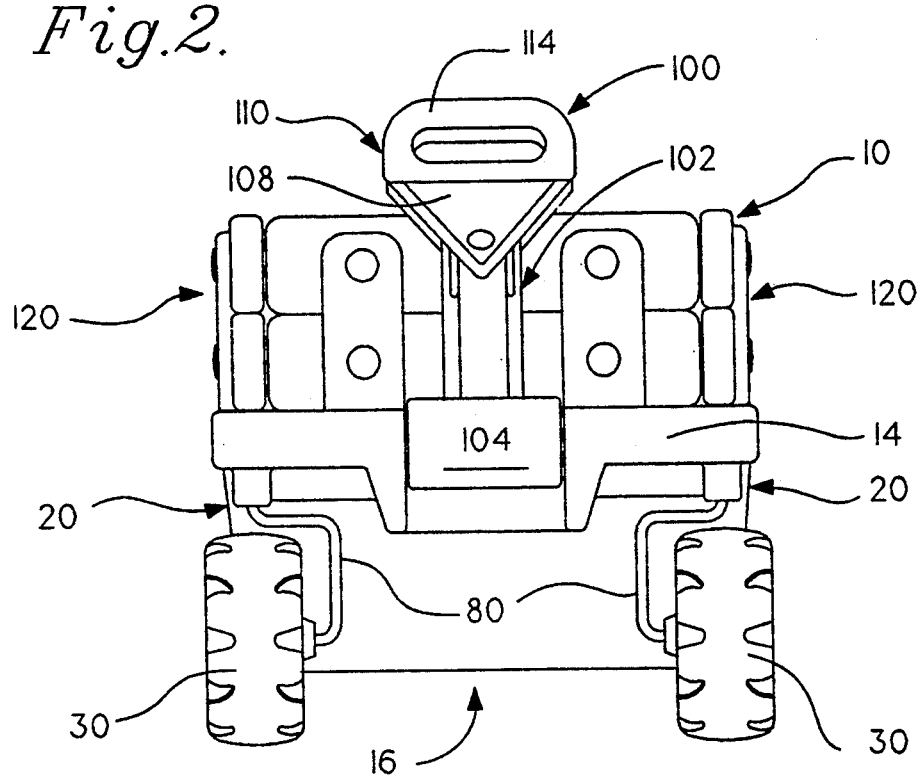
FIG. 2 is a front elevational view of the toy wagon of the present invention.

Referring now to the drawings for the purposes of illustrating the present preferred embodiment of the invention only and not for purposes of limiting the same, the Figures show a toy wagon generally designated as 10.

Figure 3:
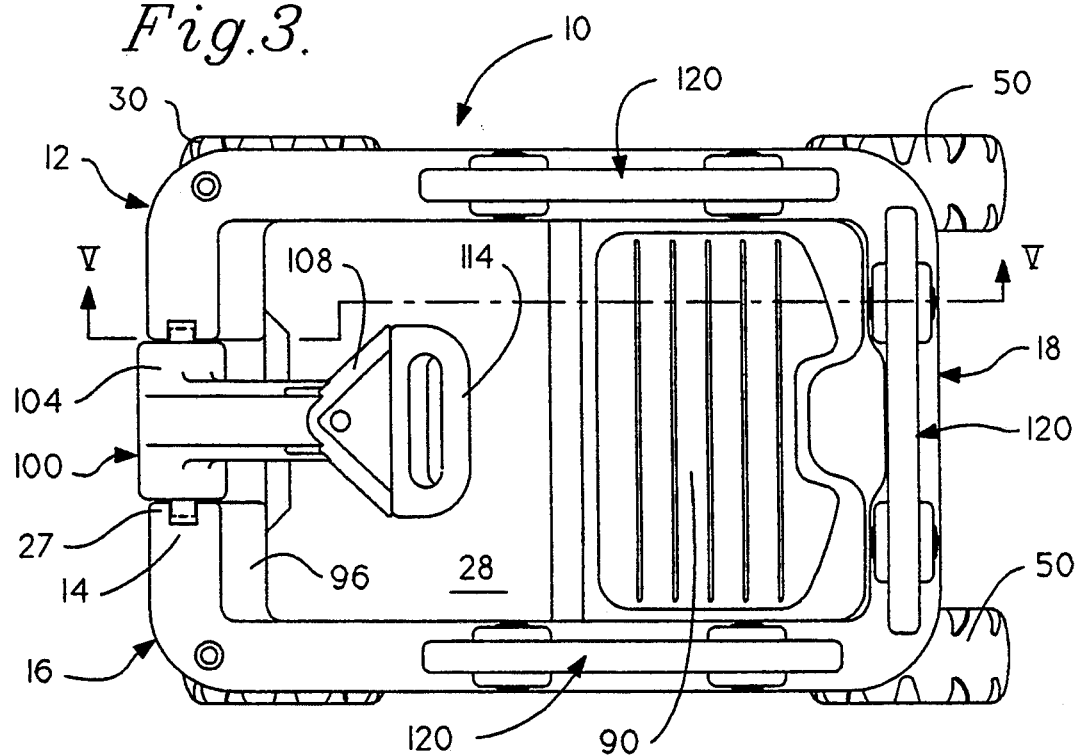
FIG. 3 is a top view of the toy wagon of the present invention.
Figure 4:
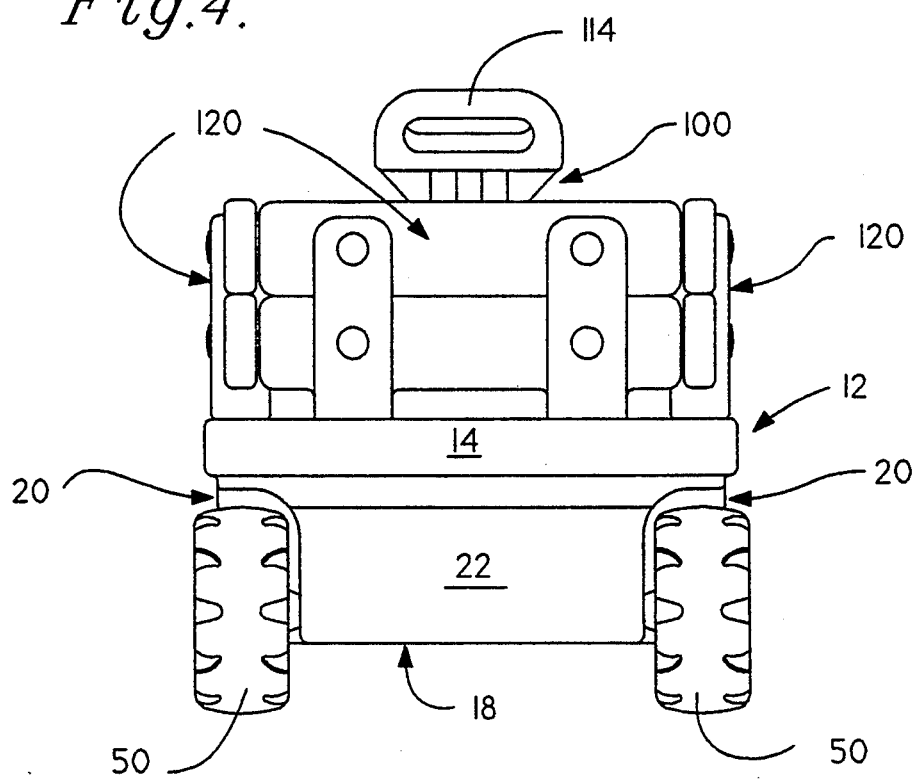
FIG. 4 is a rear elevational view of the toy wagon of the present invention.

More particularly and with reference to FIGS. 1 and 3, there is shown a toy wagon 10 having a body member 12 with two front wheels 30 and two rear wheels 50 rotatably attached thereto. As can be gleaned from FIGS. 1-4, the body member 12 preferably comprises a generally rectangularly-shaped frame 14 that has a front end, designated as 16, and a rear end, designated as 18. The body member 12, in its most preferred form, includes two hollow side members 20, a hollow rear end member 22 and a hollow sloping bottom member 24 molded or attached thereto. See FIG. 5. In the preferred embodiment, the body 12 and all of the above-described components thereof are preferably molded in one piece from low density polyethylene ("LDPE") by known manufacturing techniques. However, the skilled artisan will readily appreciate that the body member 12 can be fabricated from a variety of different materials such as, for example, other plastics, metal or wood, without departing from the spirit and scope of the present invention.

Figure 5:
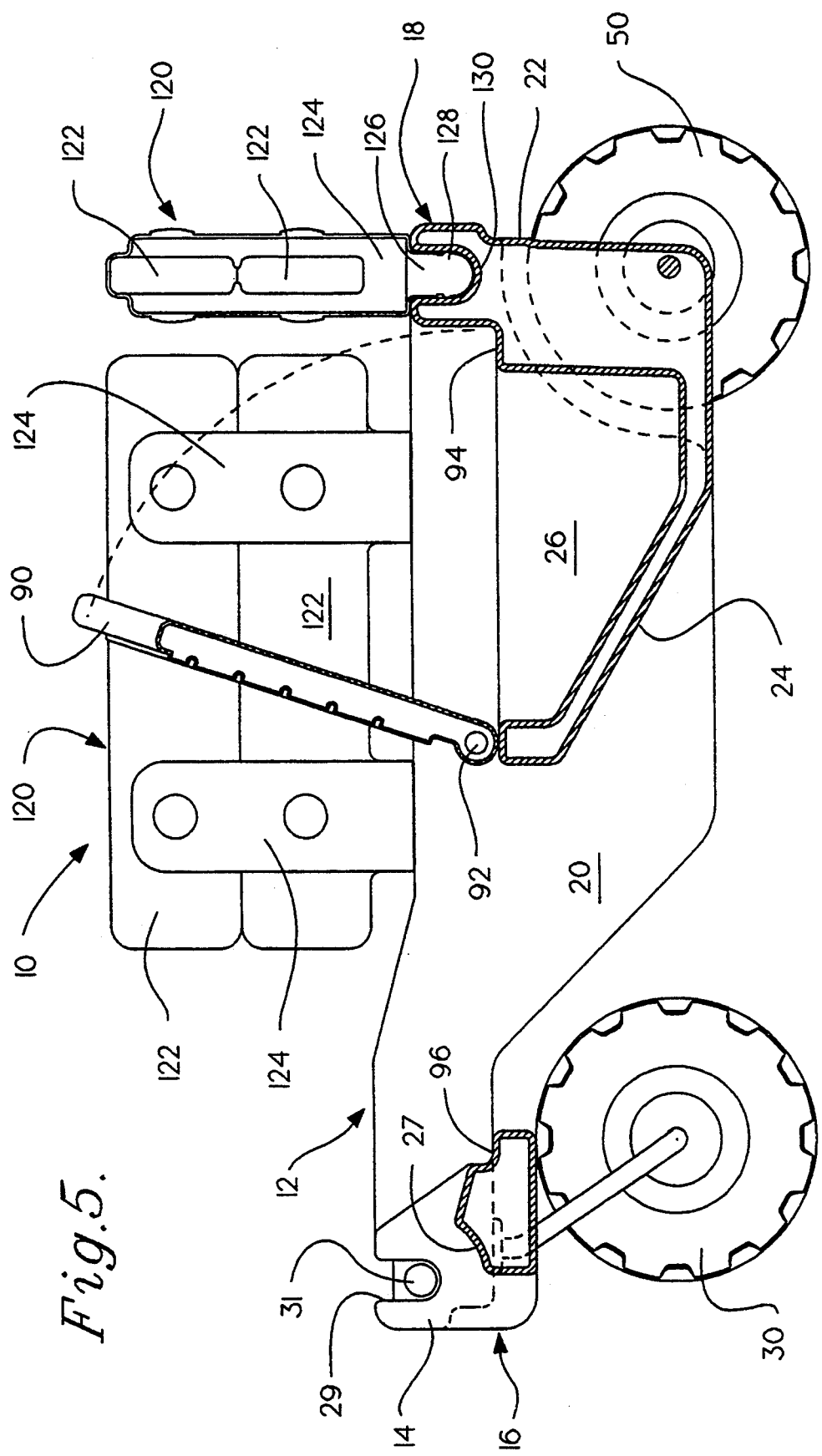
FIG. 5 is a cross-sectional elevational view of the toy wagon of the present invention taken along line V—V in FIG. 3.
Figure 6:
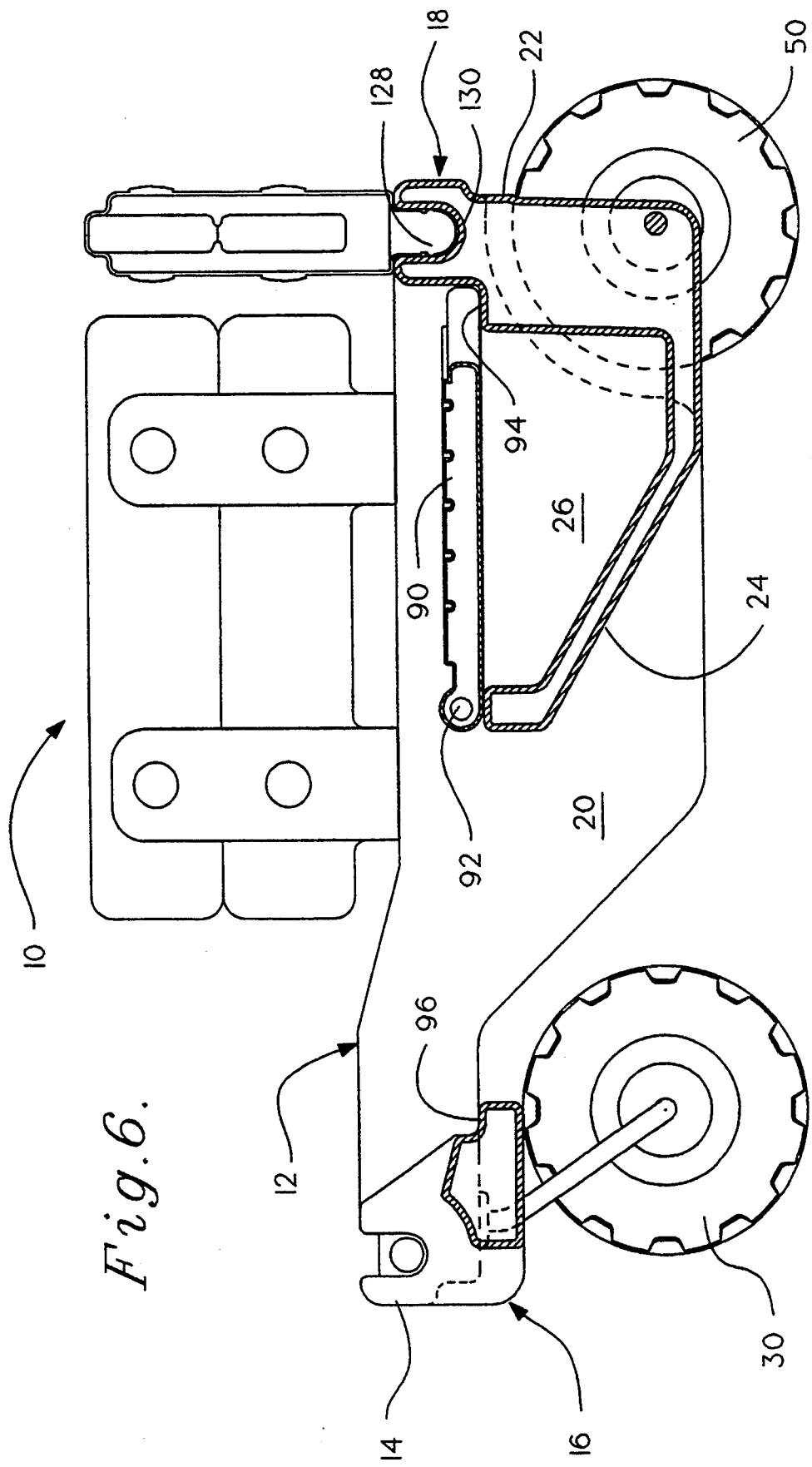
FIG. 6 is a cross-sectional elevational view of the toy wagon of the present invention taken along line V—V in FIG. 3 showing the seat member in a first position.
Figure 7:
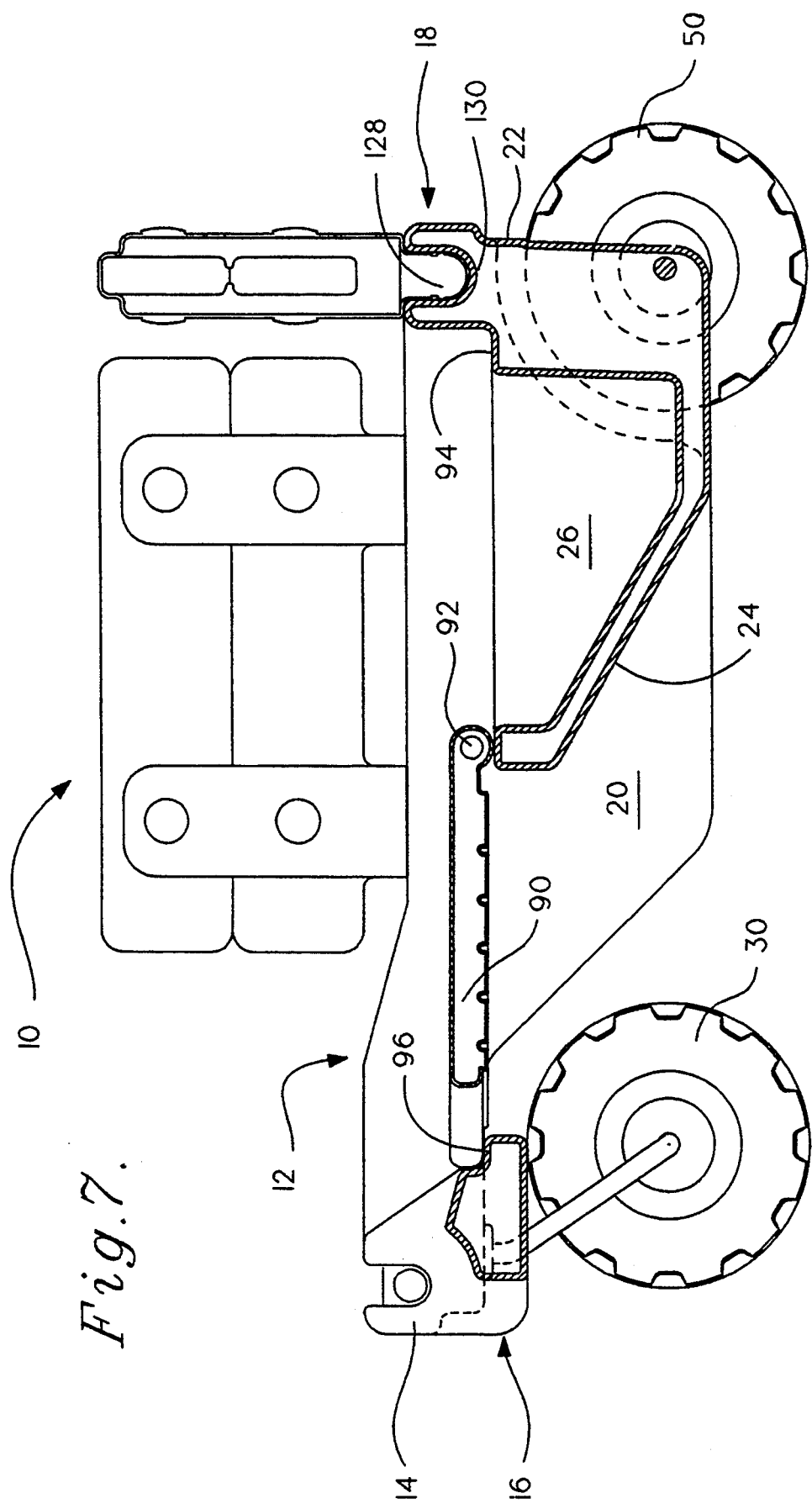
FIG. 7 is a cross-sectional elevational view of the toy wagon of the present invention taken along line V—V in FIG. 3 showing the seat member in a second position.

As can most particularly be seen in FIG. 5, the side members 20 preferably extend slopingly downward along the side of the frame 14 and cooperate with the sloping bottom member 24 to define a first storage or well area 26 located in the rear of the body member 12. The bottom member 24, in cooperation with the frame 14 and side members 20, serves to define an opening 28 in body member 12 through which, as will be more thoroughly described below, a child that is seated in the body member 12 can extend his or her legs and feet. See FIG. 3.

Figure 8:
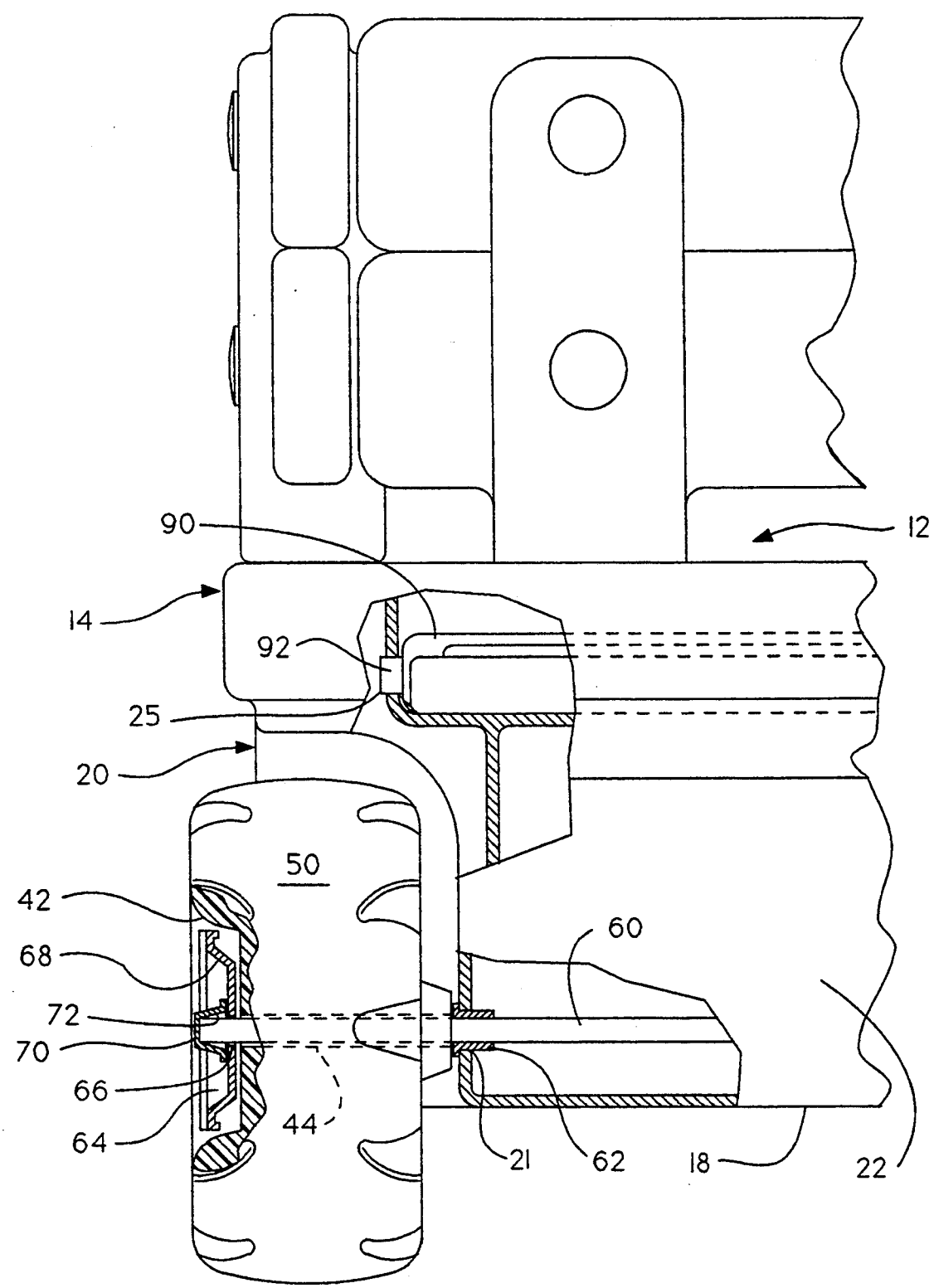
FIG. 8 is a rear elevational view of the wagon of the present invention showing some elements in cross-section.
Figure 9:
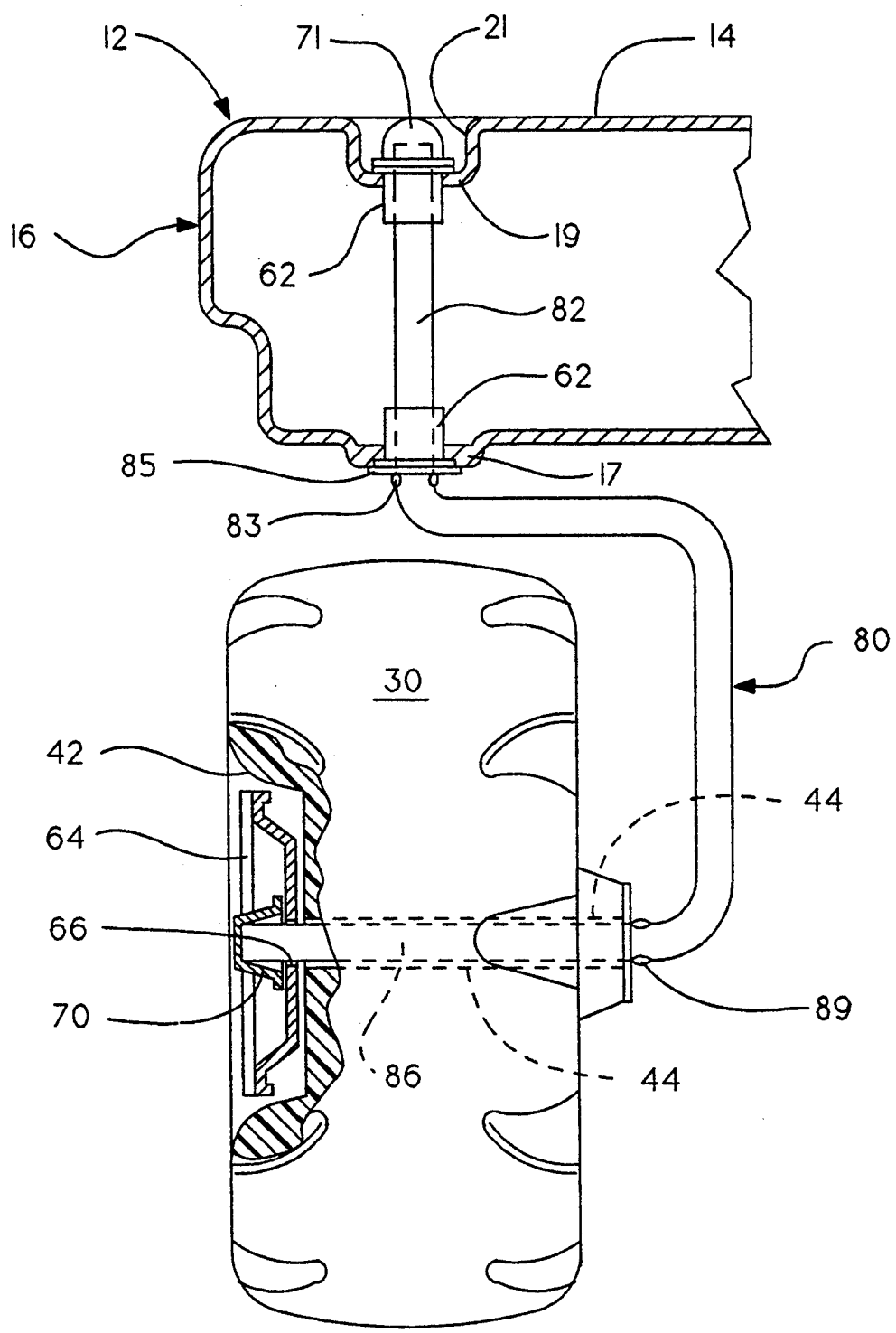
FIG. 9 is a rear elevational view of the of the wagon of the present invention showing some elements in cross-section.

Attached to the body member 12 are two front wheels 30 and two rear wheels 50. Front wheels 30 and rear wheels 50 are preferably identical in construction and are blow-molded from high density polyethylene ("HDPE") and preferably have tread patterns molded therein. As can be seen in FIGS. 8 and 9, the wheels 30 and 50 each have a central hub area 42 that has an axle-receiving aperture 44 molded therethrough. It will be recognized by those of ordinary skill in the art, however, that the aforementioned wheel/hub arrangement can be fabricated from a myriad of other materials and material combinations such as, for example, other plastics, metal or rubber.

As can be seen in FIG. 8, the two rear wheels 50 are rotatably attached to the rear portion of the body member 12 via an axle member 60. More specifically, axle member 60, preferably fabricated from a metal rod having a circular cross-section, extends through the hollow rear end member 22 and is inserted through the apertures 21 in side members 20 and ultimately extends through axle-receiving apertures 44 in wheels 50. In the preferred embodiment, hollow nylon bushings 62 are pressed into apertures 21 in side members 20 for rotatably supporting the axle member 60 within the body member 12. It will be appreciated, however, that other forms of bushings and/or bearings may also be used to rotatably attach the axle member 60 to the body member 12.

The wheels 50 are rotatably retained on the axle member 60 by hub caps 64. The hub caps 64 are also preferably molded from HDPE and each has an aperture 66 therethrough that is sized to receive a portion of the axle member 60 therein such that one end of the axle member 60 protrudes through the aperture 66 as shown in FIG. 8. Also, each hub cap 64 preferably has a cavity 68 therein that is coaxial with the aperture 66 and adapted to receive therein a retaining nut 70. The retaining nut 70 has a cavity 72 therein that is sized to receive one end of axle member 60 therein in pressed-fit engagement. By virtue of the aforementioned construction, rear wheels 50 are rotatably fastened to the rear of the body member 12. It will be appreciated, however, that rear wheels 50 may be fastened to the body member 12 by a myriad of other known fastening means and arrangements without departing from the spirit and scope of the present invention.

In the preferred embodiment, the front wheels 30 are fastened to the front end of the body member 12 by means of an axle member 80. See FIGS. 2 and 9. The axle members 80 are preferably fabricated from 5/16 diameter 1045 cold rolled steel rod having a circular cross-section and are provided in the configurations shown in FIGS. 10 and 11. It will be appreciated, however, that axle members 80 can also be fabricated from a variety of other materials and be provided in different configurations.

Figure 11:
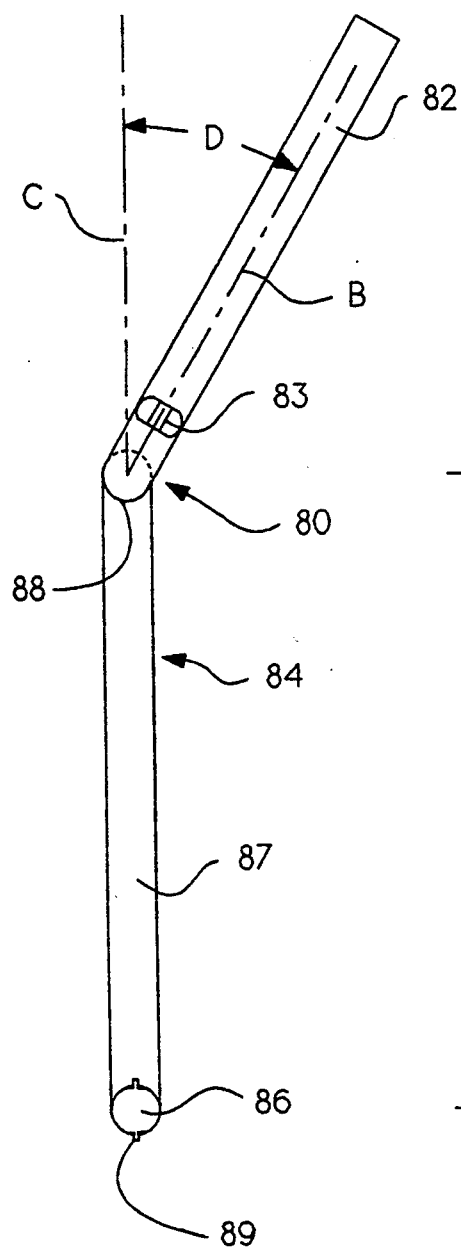
FIG. 11 is a side elevational view of a front axle of the wagon of the present invention.
Figure 10:
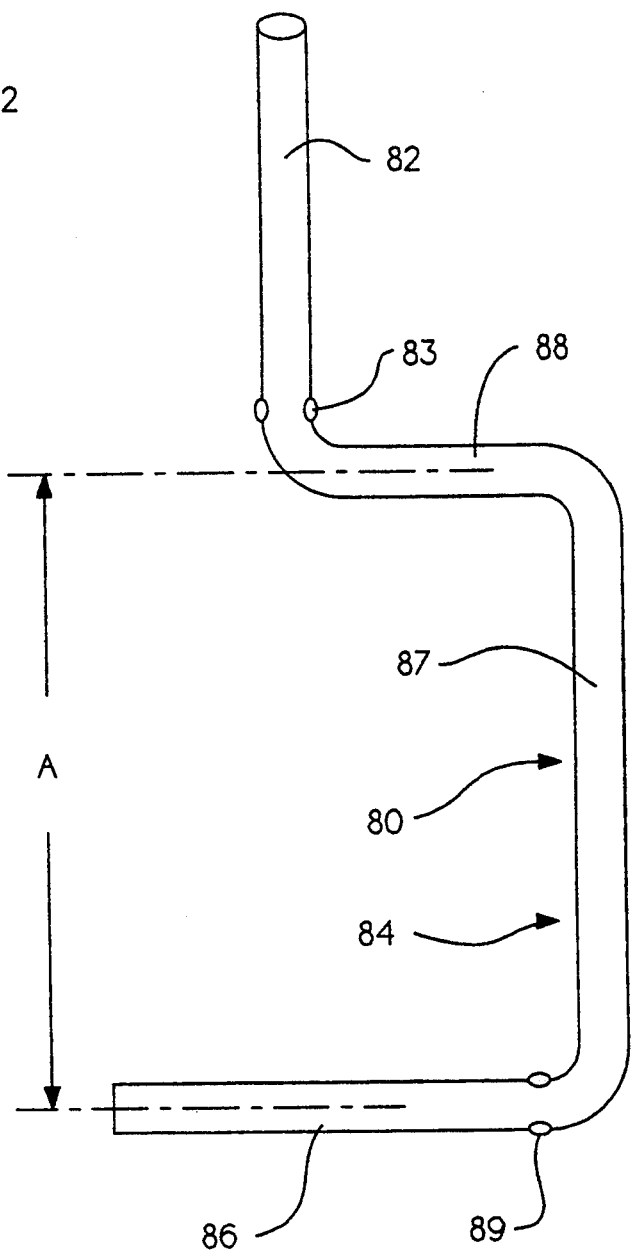
FIG. 10 is a front elevational view of a front axle of the wagon of the present invention.
Figure 17:
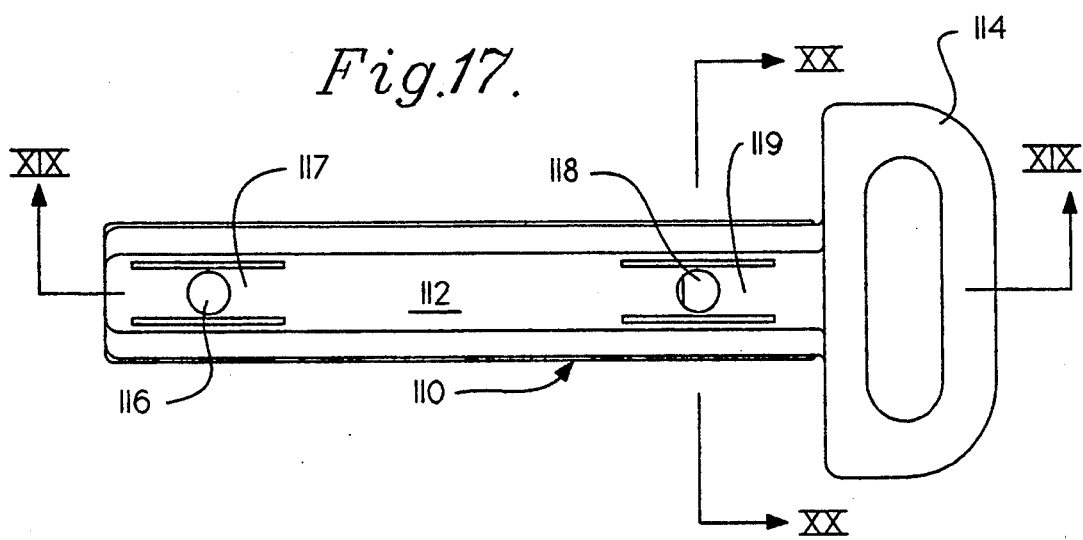
FIG. 17 is a top view of the upper handle member of the present invention.
Figure 18:
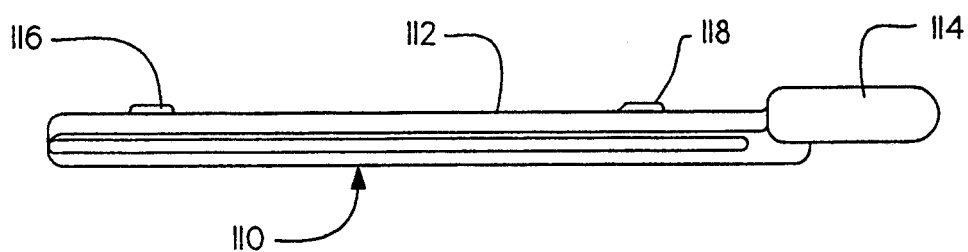
FIG. 18 is a side elevational view of the upper handle member of the present invention.
Figure 19:
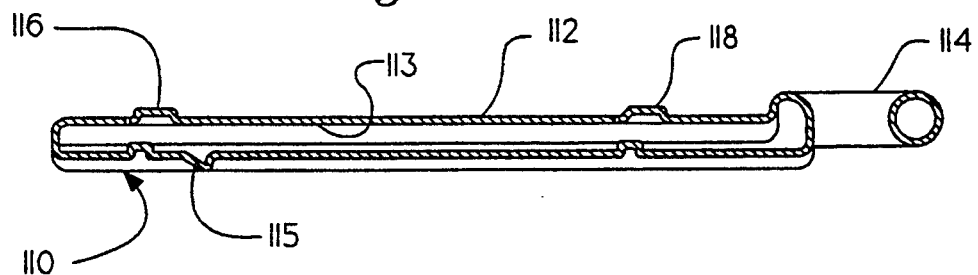
FIG. 19 is a cross-sectional elevational view of the upper handle member of the present invention taken along line XIX—XIX in FIG. 17.
Figure 20:
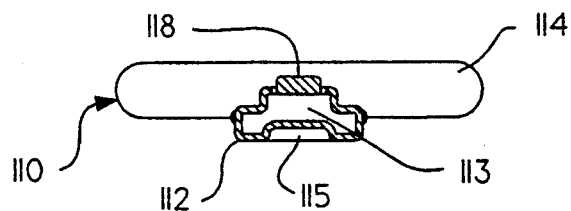
FIG. 20 is a cross-sectional elevational view of the upper handle member of the present invention taken along line XX—XX in FIG. 17.
Figure 26:
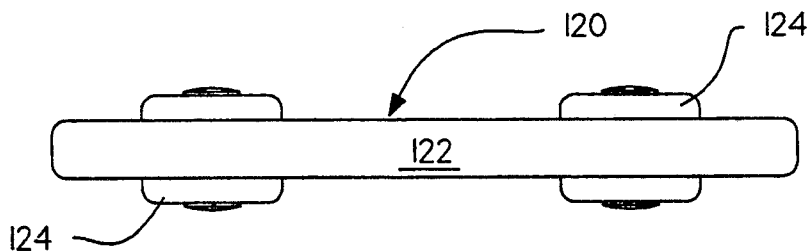
FIG. 26 is a top view of a panel member of the present invention.
Figure 25:
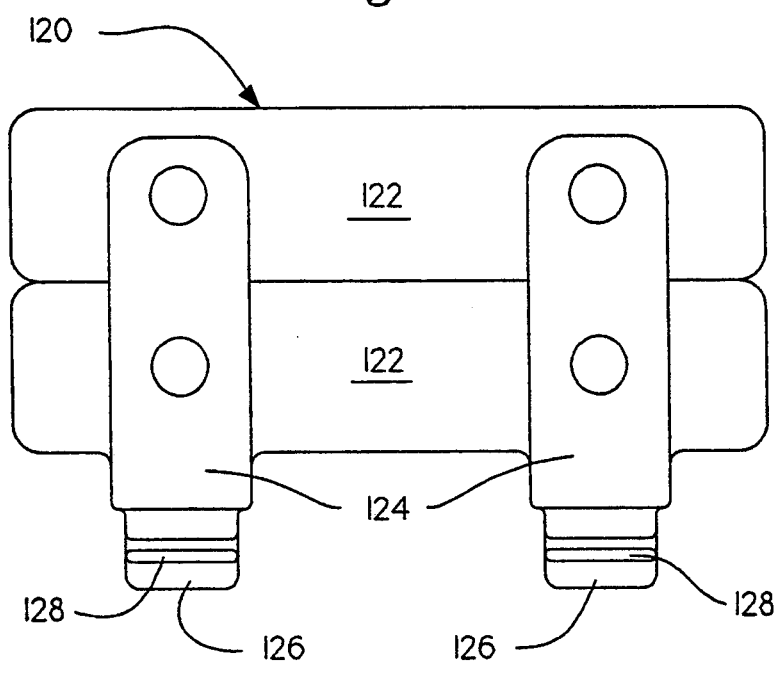
FIG. 25 is front elevational view of a panel member of the present invention.
Figure 27:
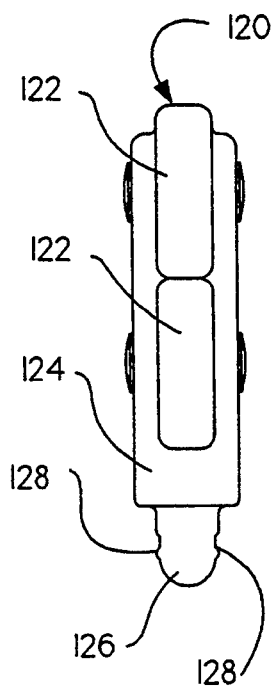
FIG. 27 is a side elevational view of a panel member of the present invention.
Figure 28:
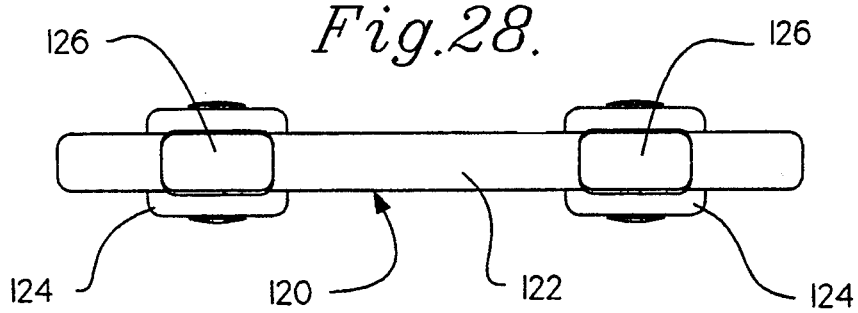
FIG. 28 is a bottom view of a panel member of the present invention.

As shown in FIGS. 10 and 11, axle members 80 have an upwardly extending connection portion 82 and a "C"-shaped lower portion 84. In particular, the "C"-shaped lower portion 84 of axle 80 has a wheel receiving member 86, a central member 87, and an upper member 88 that is substantially parallel to the wheel receiving member 86. The distance between the wheel receiving member 86 and the upper member 88, generally designated as "A", must be sufficiently large enough to permit the corresponding wheel 30 to be rotatably received on the wheel receiving member 86. Also, as shown in FIG. 11, the angled connection member 82 has an axis designated as "B" and the central member 87 has an axis designated as "C". In the preferred embodiment, the angle "D" that extends between axis "B" and axis "C" is approximately 31 degrees; however, other angular orientations may also be used. It will also be appreciated that the axle member 80 used to attach a wheel 30 to the left front side of the body member 12 is a left-handed version of the axle 80 used to connect a wheel 30 to the right front side of the body member 12.

As can be seen in FIG. 9, the wheels 30 are attached to their corresponding axle member 80 by inserting the wheel receiving member 86 through the axle receiving aperture 44 located in the central hub 42 of wheel 30. It will be appreciated that aperture 44 is sized to permit the wheel 30 to freely rotate on wheel receiving member 86. In the preferred embodiment, detents 89 are provided on the wheel receiving member 86 to limit the lateral travel of wheel 30 thereon. Wheel 30 is rotatably retained on wheel receiving member 86 by means of a hub cap 64 and retaining nut 70. In particular, hub cap 64 has an aperture 66 therethrough that is sized to rotatably receive the receiving member 86 therethrough. The retaining nut 70 is then pressed onto the end of the receiving member 86 to retain the hub cap 64 and the wheel 30 on the receiving member 86. By virtue of this construction, wheels 30 are rotatably fastened to their corresponding axle member 80.

The manner in which axle 80 is rotatably attached to body member 12 will now be explained with it being understood that both axles 80 are preferably fastened to the body member 12 in a similar manner. The axle member 80 is rotatably attached to the body member 12 by inserting the upwardly extending connection member 82 into two coaxial apertures (17, 19) located in the front end portion 16 of the hollow frame member 14. See FIG. 9. Detents 83 are preferably formed on connection member 82 to limit the upward travel of the connection member 82 into the frame member 14. In addition, to prevent detents 83 from enlarging the lower aperture 17 as the connection member 82 rotates therein, a flat washer 85, preferably fabricated from steel, is inserted onto the connection member 82 so that it is positioned between the detents 83 and the frame member 14. Also, as shown in FIG. 9, hollow nylon bushings 62 are preferably pressed into apertures (17, 19) for rotatably supporting the connection member 82 within the hollow frame member 14. It will be appreciated, however, that other bushings and/or bearings may also be used to rotatably support the connection member 82 within the frame member 14.

In the preferred embodiment, the frame member 14 has a cavity 21 formed therein into which the top end of the connection member 82 extends. A commercially available acorn nut 71 is then pressed onto the top of the connection member 82 to complete the fastening process. The reader will appreciate that the above described arrangement for fastening the axles 80 to the body member 12 serves to provide the front wheels 30 with a castering effect to aid in steering of the wagon 10. The skilled artisan will appreciate, however, that the front wheels 30 may be attached to the body member 12 by a myriad of other known bearing and axle arrangements and may even be attached to the body member by known steering apparatuses so that the wagon may be steerable by, for example, a handle member or a steering wheel.

As can be seen in FIGS. 3 and 5-8, the preferred form of the wagon 10 includes a seat member 90 that is pivotally attached to the body member 12. The seat member 90 is preferably hollow and is molded from HDPE by known manufacturing techniques and is sized such that it may pivotally extend between the side members 20. The seat member 90 also preferably has two pivot pins 92 molded thereto for pivotally attaching the seat member 90 to the side members 20. The pin members 92 are adapted to be rotatably received in corresponding receptacles 25 provided in each of the side members 20 as shown in FIG. 8. As such, when the pin members 92 are received within the corresponding receptacles 25, the seat member 90 may be pivoted from a first position wherein it overlays the first storage area 26 (see FIG. 6) to a second position wherein it overlays or covers the opening 28 in the body member 12 (see FIG. 7). A support ledge 94 is also preferably formed around the inside of rear end member 18 and the side members 20 to lend support to the seat member 90 when it is in the first position. Accordingly, when the seat member 90 is pivoted to the first position it is supported by the ledge 94 in a horizontal position, thereby making it possible for an individual to sit on the seat 90 and extend his or her legs and feet through the opening 28 to contact the surface upon which the wagon 10 is supported. As such, the seated individual may then propel the wagon 10 by shuffling his or her feet along the surface.

In the alternative, the seat member 90 may be pivoted to a second position wherein it overlays or covers the opening 28, to thereby increase the hauling capacity of the body member 12. See FIG. 7. In the preferred embodiment, the front end 16 of the frame member 14 also has a support ledge 96 formed therein for supporting the seat member 90 when it is pivoted to the second position. It will therefore be appreciated that when the seat member 90 is pivoted to the second position, the body member's hauling capacity will be increased.

The preferred form of the wagon 10 includes an extendable handle assembly 100 that is pivotally attached to the front end 16 of the frame member 14. In particular, the handle assembly 100, as shown in FIGS. 12-24, consists of a hollow lower member 102 and an upper member 110 that is adapted to be slidably received in the hollow lower handle member 102. In their most preferred form, the lower member 102 and the upper member 110 of the handle assembly 100 are molded from HDPE by known manufacturing techniques. However, the skilled artisan will appreciate that the lower member 102 and the upper member 110 of the handle assembly 100 may be fabricated from a variety of other materials and processes.

The lower handle member 102 has a hollow socket portion 103 that is preferably pivotally attached to the front end 16 of the frame member 14 by a cylindrical attachment member 104 that is molded thereto. As can most particularly be seen in FIGS. 15 and 16, the upper end 105 of the hollow socket portion 103 has ribs 105 and 107 formed therein to restrict the slidable movement of the upper handle member 110 when it is received within the lower handle member 102.

The cylindrical attachment member 104 preferably has an outwardly extending circular connection pin 106 extending from each end thereof for pivotally attaching the cylindrical attachment member 104 to the front end 16 of the frame member 14 in the following manner. In particular, as shown in FIGS. 3 and 5, the front end 16 of frame 14 has a central cavity 27 formed therein that is sized to rotatably receive the cylindrical attachment member 104 therein. Each end of the cavity 27 has a socket 29 and a pin receiving receptacle 31 therein adapted to rotatably receive a corresponding connection pin 106. As such, the lower handle member 102 is pivotally connected to the front end 16 of frame member 14 by inserting the cylindrical attachment member 104 into the cavity 27 such that the connection pins 106 enter the sockets 29 to ultimately be rotatably received in the corresponding receptacles 31.

The upper handle member 110 of the handle assembly 100 preferably consists of a hollow lower blade-shaped portion 112 that has a cavity 113 that extends the length thereof. The hollow blade-shaped portion 112 also preferably has a grippable upper member 114 molded thereto. See FIGS. 17–20. In the preferred embodiment, the blade-shaped portion 112 is adapted to be slidably received within the hollow socket portion 103 of the lower handle member 102. As can be seen in FIGS. 21 and 22, the upper end of the lower handle member 102 has a "V"-shaped portion 108 that is adapted to abut the grippable upper member 114 when the blade-shaped portion 112 is fully received within the lower handle member 102.

As can be seen in FIGS. 21–24, the handle assembly 100, in its most preferred form, may be locked in two different positions by a push button arrangement provided on the upper handle member 110. In particular, the blade-shaped portion 112 of the upper handle member 110 has two depressible buttons 116 and 118 formed therein that are adapted to be received in aperture 109 provided in the "V"-shaped upper end 108 of the lower handle member 102. See FIGS. 17–19. More specifically, the button members 116 and 118 are molded into one end of depressible tongue members 117 and 119, respectively. It will be appreciated that such arrangement permits the buttons 116 and 118 to be selectively depressed into the cavity 113 of the hollow blade-shaped portion 112. When the handle assembly 100 is in a fully extended position as shown in FIGS. 23 and 24, the retaining button 116 will be received in the aperture 109 thereby locking the handle assembly 100 in that extended position. In addition, blade-shaped-member 112 preferably has a downwardly extended stop member 115 molded thereto that is adapted to engage rib 105 of the lower handle member 102 to further prevent the upper handle member 110 from being pulled out of the lower handle member 102.

Referring specifically to FIGS. 21–24, the operation of handle member will now be explained. When the handle assembly 100 is fully retracted, as shown in FIGS. 21 and 22, the upper retaining button 118 will be received in aperture 109 as shown. When in this position, the retaining button 109 serves to lock the upper handle member 110 to the lower handle member 102 in that fully retracted position. To extend the handle assembly 100, as shown in FIGS. 23 and 24, the upper retaining button 118 is depressed or deflected into cavity 113 to a point wherein it disengages the aperture 109 to thereby permit the upper handle member 110 to be pulled out of the lower handle member 102 in the direction indicated by the arrow "E" until the lower retaining button 116 engages aperture 109 to, thus, lock the handle assembly 100 in that extended position. To once again return the handle assembly 100 to a fully retracted position, the lower retaining button 116 is depressed into the cavity 113 to a point wherein it disengages aperture 109 and the blade-shaped portion 112 of the upper handle member 100 is then slid into the lower handle member 102 in the direction of arrow "F" until the upper retaining button 118 once again engages the aperture 109. Those of ordinary skill in the art will also appreciate that additional apertures (not shown) may be provided in lower handle member 102 to engage button 116 when the upper handle member 110 is extended to a variety of other positions.

We have found that the previously described extendable handle arrangement has a number of specific advantages. In particular, the handle member may be extended to a length that is compatible with the height of a person or child that is pulling the wagon. In addition, when the handle assembly 100 is fully retracted, it typically can be gripped by a child that is riding in the wagon.

As shown in FIGS. 25–28, the wagon 10 of the present invention may also be equipped with removable panel members 120 for increasing the hauling capacity of the body member 12. The panel members 120 are preferably hollow and are molded from HDPE by known manufacturing techniques in the shape of a gate having two cross members 122 and two vertical members 124. It will be readily appreciated, however, that panels 120 may be fabricated from a variety of other materials such as, for example, other plastics, wood or metal without departing from the spirit or scope of the present invention.

In the preferred embodiment, the vertical members 124 each have a connection member 126 formed on one end thereof for removably attaching the panel members 120 to the body member 12. In particular, the connection members 126 are adapted to be slidably inserted into corresponding receptacles 130 provided in the frame member 14. See FIG. 5. Preferably, each connection member 126 has rib members 128 formed thereon that are adapted to engage the sides of the receptacle 130. See FIGS. 5–7, 25 and 27. It will be appreciated that such rib arrangement serves to removably retain the connection members 126 within their corresponding receptacles 130 by means of an interference fit created between each of the ribs 128 and the sides of the corresponding receptacle 130.

The reader will appreciate that the aforementioned panel arrangement permits one to increase the hauling capacity of the body member 12 by connecting the panel members 120 to the frame 14 of body member 12. As shown in FIG. 3, three panel members 120 are typically used; however, because the panel members 120 may be fabricated in a variety of different sizes and configurations, other numbers of panel members 120 may also be used.

Accordingly, the wagon 10 of the present invention can perform many functions. In particular, the wagon can function as a ridable toy for a child or, in the alternative, it can function as a means for hauling various items, such as, for example, small toys. When functioning as a ridable toy, the seat member 90 is pivoted to a first occupant supporting position wherein it overlays the first storage area 26. It will be appreciated that even with the seat member 90 pivoted to the first occupant supporting position, a small amount of items may be stored in the storage area 26. When the seat member 90 is pivoted to the first occupant supporting position, a child may be supported on the seat 90 and extend his or her legs and feet through the opening 28 to propel the wagon. When the wagon is being propelled by the rider, the handle assembly 100 is typically fully retracted so that the rider can grasp the grippable member 114. In the alternative, the handle assembly 100 may be selectively extended to a position wherein the child's parent or playmate can comfortably pull the wagon along behind them.

The wagon 10 of the present invention may also function as a hauling device for hauling a variety of articles such as a child's toys, books, dolls, etc. When functioning as a hauling device, the seat member 90 is pivoted to a second position wherein it overlays the opening 28 in the body member 12, thus enabling the entire body member 12 to be filled with articles. The hauling capacity of the body member 12 can also be increased by attaching the panel members 120 to the frame 14. Accordingly, the present invention provides a unique wagon and ridable toy vehicle for children. It will be understood, however, that various changes in the details, materials and arrangements of parts which have been herein described and illustrated in order to explain the nature of the invention may be made by those skilled in the art within the principle and scope of the invention as expressed in the appended claims.

We claim:

1. A toy wagon comprising:

a body member having side members add a rear member connected to said side members and extending therebetween and a bottom member which comprises a rearwardly sloping portion, said bottom member extending between said side members and being attached to said side members and said rear member to define a storage well in said body member;

a seat member pivotally attached to said body member, said seat member pivoting between a first occupant supporting position overlying said storage well and a second position wherein said storage well is uncovered;

a plurality of wheels rotatably attached to said body member for movably supporting said body member on a surface;

an opening in said body member through which an occupant's feet may extend to contact the surface when said seat member is in said first position; and a handle member attached to said body member.

2. The wagon of claim 1 wherein said seat member covers said opening in said body member when said seat member is in said second position.

3. The wagon of claim 1 wherein said handle member is pivotally attached to said body member.

4. The wagon of claim 1 wherein said handle member is selectively extendable to a plurality of predetermined lengths.

5. The wagon of claim 1 further comprising at least one panel member removably attachable to said body member such that said panel member extends upwardly from said body member.

6. The wagon of claim 5 wherein said at least one panel member has a plurality of connection members attached thereto that are adapted to be removably inserted into a corresponding number of sockets provided in said body member.

7. A toy wagon comprising:

a body member having side members and a rear member attached to said side members and extending therebetween and a bottom member which comprises a rearwardly sloping portion, said bottom member extending between said side members and being attached to said side members and said rear member to define a storage well in said body member;

a plurality of wheels rotatably attached to said body member for movably supporting said body member on a surface;

an opening in said body member through which an occupant's legs and feet may extend to contact said surface;

a seat member pivotally attached to said body member, said seat member pivoting between a first occupant supporting position overlying said storage well and a second position wherein said seat member overlays said opening in said body member;

a plurality of panel members removably attachable to said body member, each said panel member having at least one connection member attached thereto that is adapted to be slidably received in a corresponding receptacle provided in said body member such that when said connection member of said panel member is received within said corresponding receptacle, said panel member extends upwardly from said body member;

a hollow first handle member pivotally attached to said body member and having a plurality of apertures therein;

a second handle member having a first end and a second end, said first end having a grippable member attached thereto and said second end being slidably received within said hollow first handle member such that said second handle member may be slidably extended to a plurality of predetermined positions with respect to said first member; and means for selectively retaining said second handle member in any of said predetermined positions comprising at least one button member attached to said second handle member, said button member being sized to be received in any one of said apertures in said first handle member to thereby retain said second handle member in one of said predetermined positions, said button member being selectively movable between a first position wherein said button member is received within one of said apertures and a second position wherein said button member is not received in any of said apertures to thereby enable said second handle member to be slidably moved to one of said predetermined positions.

* * * * *